United States Patent [19]

Breckner et al.

[11] Patent Number: 5,002,463

[45] Date of Patent: Mar. 26, 1991

[54] APPARATUS AND METHOD FOR FLOW CONTROL

[75] Inventors: Raymond A. Breckner, Richmond; Kurt K. Henriksson, Vancouver, both of Canada

[73] Assignee: Innovac Technology Inc., Richmond, Canada

[21] Appl. No.: 336,918

[22] Filed: Apr. 12, 1989

Related U.S. Application Data

[63] Continuation-in-part of Ser. No. 225,811, Jul. 29, 1988, abandoned.

[51] Int. Cl.⁵ .................. F04B 15/02; F04B 49/00
[52] U.S. Cl. .................... 417/20; 417/141; 417/144; 417/53
[58] Field of Search ............... 417/118, 120, 126, 128, 417/130, 137, 138, 139, 141, 144, 145, 146, 147-149, 20, 40, 133, 134, 86, 101, 131, 53; 210/104, 124, 744; 43/6.5; 406/15-17, 109

[56] References Cited

U.S. PATENT DOCUMENTS

| | | | |
|---|---|---|---|
| 1,642,250 | 9/1927 | Langdon | 417/120 |
| 2,207,313 | 7/1940 | Gollner | 417/134 |
| 2,666,671 | 1/1954 | Kimmerle | 43/6.5 X |
| 2,736,121 | 2/1956 | Kimmerle | 43/6.5 |
| 3,422,768 | 1/1969 | Repp | 417/138 |
| 3,583,365 | 6/1971 | Harden | 43/6.5 X |
| 3,606,585 | 9/1971 | Graves | 417/127 |
| 3,871,332 | 3/1975 | Hayashi | 43/6.5 X |
| 3,930,755 | 1/1976 | Lahr et al. | 417/120 |
| 4,307,525 | 12/1981 | Maloblocki | 417/125 X |
| 4,508,488 | 4/1985 | Pikna | 417/20 |
| 4,517,099 | 5/1985 | Brackner | 406/17 X |
| 4,684,295 | 8/1987 | Ranson | 417/137 X |
| 4,770,610 | 9/1988 | Breckner | 417/12 |

Primary Examiner—Leonard E. Smith
Assistant Examiner—Eugene L. Szczecina, Jr.
Attorney, Agent, or Firm—Shlesinger & Myers

[57] ABSTRACT

The invention provides an apparatus and method for handling a solid/liquid mixture, for example for conveying fish immersed in a fish/water mixture. The apparatus has a receiving chamber to receive the mixture through an inlet valve thereof when the chamber is subjected to low pressure, and to discharge the mixture through an outlet valve thereof when pressure in the chamber is increased. A quantity sensor is responsive to a pre-determined quantity of mixture within the chamber to isolate the chamber from low pressure when the pre-determined quantity is reached. The inlet and outlet valves are responsive to pressure differences thereacross. The inlet valve is positioned adjacent an upper portion of the chamber above maxium upper level of mixture within the chamber and has seat clearing structure to clear the inlet valve of solids when flow therethrough ceases. Inlet and outlet flow sensors are responsive to flow through the inlet and outlet valves respectively. The quantity sensor also has a mode selector for selecting mode of operation of the apparatus to control pressure changes within the chamber.

38 Claims, 5 Drawing Sheets

APPARATUS AND METHOD FOR FLOW CONTROL

CROSS-REFERENCE TO RELATED APPLICATIONS

This is a Continuation-in-Part of my co-pending U.S. Pat. application, Ser. No. 225,811, filed 29 July 1988 now abandoned and entitled FLOW DETECTOR AND METHOD.

BACKGROUND OF THE INVENTION

The present invention is closely related to an earlier invention entitled "Apparatus and method for handling solids in liquid" as described and claimed in U.S. Pat. No. 4,517,099, issued 14 May 1985 to Raymond A. Breckner, one of the inventors herein. The patent, the disclosure of which is incorporated herein by reference, describes a device having a chamber with inlet and outlet valves, the inlet valve being positioned at an upper portion of the tank so as to be clear of a maximum upper level of liquid within the tank. Mixture is drawn into the tank, when exposed to a low pressure source, through an inlet duct which has an upwardly curved riser means which constrains the mixture to pass initially upwardly, prior to discharging downwardly through the inlet valve. The inlet valve is a hinged plate which is opened when the pressure within the chamber is reduced, and closes when the pressure is increased. The patented device has an outlet valve at a lower portion thereof, which has a hinged plate which is closed by reduced pressure within the chamber, and opened when pressure increases.

The patented device provides a means of ensuring that the inlet valve can close without trapping fish that might otherwise become inadvertently trapped therein. As the chamber fills, the mixture attains a predetermined level at which time the low pressure source is isolated from the chamber The mixture continues to flow through the inlet duct until the pressure differential across the inlet valve is insufficient to maintain the inlet flow, at which time the flow ceases. Any fish that might tend to rest on the inlet valve will fall forwardly through the valve into the chamber, or backwardly into the inlet duct. Prior to raising pressure in the chamber, sufficient time is allowed to permit flow through the inlet valve to cease, and to permit any solids that might collect adjacent the valve to fall from the valve, thus permitting the inlet valve to close cleanly. The above patent thus discloses an arbitrary time delay to ensure that flow in the inlet duct has ceased prior to closure of the inlet valve. However, it does not provide any means of directly measuring when flow through the inlet duct has actually ceased, and thus, to accommodate many variables in different installations, it is usual to provide a conservatively excessive time for flow through the inlet duct to cease, prior to raising pressure in the chamber.

While providing an excessive time for flow through the inlet duct to cease ensures that the inlet valve can close without trapping solids upon raising of the pressure, in many situations excessive time is wasted when there is no flow in the duct and the pressure in the chamber is not rising.

Pumps for conveying fish immersed in water, for example from fish holds onto a dockside, or within a fish processing plant, have been used for many years. It is well known that fish debris, e.g. fish scales, fins, roe, etc., from damaged fish is highly adhesive or tenacious and is prone to sticking to any mechanism that is exposed to the debris, and in a short while the mechanism can become seized and no longer functions. Clearing fish debris from such mechanism can be very time consuming, as sometimes considerable mechanical force is required to remove the contaminants. Consequently, any attempt to directly detect or sense flow of a liquid/fish mixture in a duct is susceptible to seizure if the apparatus is not used for some time. Because fish handling equipment tends to be used only during and shortly after the fishing season, such equipment tends to be left for long periods of time without being used, and even after thorough cleaning, is prone to seizure due to tenacious characteristic of fish debris.

SUMMARY OF THE INVENTION

The invention reduces the difficulties and disadvantages of the prior art by providing an apparatus and method in which flow in a inlet duct upstream of the inlet valve can be detected directly without requiring a selected time period or time delay sufficient for flow through the duct to cease. Thus, the time delay disclosed in the previous patent is not required as cessation of flow can be detected directly in the present invention. Flow through an outlet duct from the apparatus can also be sensed directly, and thus timing of changes of pressure applied to the chamber can be accurately controlled, so as to avoid inadvertently early or late closing of inlet or outlet valves, as a result of pressure changes within the chamber. The present invention also uses an inlet valve seat clearing structure similar to the patented inlet clearing structure which permits any solids that might otherwise tend to come to rest adjacent the inlet valve when the mixture flow therethrough ceases to fall under gravity either forwardly through the inlet valve and into the chamber, or backwardly through the inlet duct.

By sensing flow in both the inlet and outlet ducts, the invention can be installed in many different installations, with different heights for both drawing mixture into the chamber, and for pumping mixture from the chamber, without requiring many test runs to provide timing adjustment for pressure changes for specific installations. Direct monitoring of cessation of flow in the ducts ensures that pumping efficiency is improved because pressure changing can occur within the chamber essentially immediately after flow in the inlet and/or outlet duct ceases.

Also the invention is capable of pumping liquid to discharge at a location either above the apparatus, or below the apparatus without requiring a large number of tests at the installation.

Furthermore, the apparatus uses a control system which, if desired, can be fully hydraulic, and thus requires no electrical components for actuation of valves, detecting fluid levels or flow within ducts, etc. Furthermore, the apparatus can use novel hydraulic valves which are actuated remotely, under relatively low forces generated by magnets, and this permits use of relatively low fluid pressures which enables use of low pressure hoses, pumps, etc., requiring less energy for operation, and lower standards for pressurized fluid components, thus reducing initial costs and maintenance costs. The use of remotely actuated valves simplifies construction and permits complete isolation of the valve mechanism from contaminants. Isolating the valve from the mixture also prevents possible contamination of the mixture with oil from the valve. This provides an apparatus which can be used on an irregular basis, with long periods of non-use between uses, with negligible problems resulting from contamination due to salt water corrosion, or foreign body contamination such as fish debris tending to seize or restrict movement of delicate flow detecting components, valve actuators, etc.

The invention provides an apparatus which comprises a receiving chamber, pressure lowering and raising means, quantity sensing means, valve seat clearing means and an inlet flow sensor. The receiving chamber is adapted to receive the mixture from an inlet duct in an induction mode and to hold the mixture temporarily prior to discharging the mixture in a discharge mode. The chamber has inlet and outlet valves, the inlet valve communicating with the inlet duct to receive the mixture and being positioned adjacent an upper portion of the chamber above an uppermost level of mixture within the chamber. The pressure lowering means is for lowering pressure in the chamber to expose the inlet valve to a pressure difference so as to open the inlet valve and to draw mixture therethrough in the induction mode. The pressure raising means is for raising pressure in the chamber in the discharge mode which tends to close the inlet valve. The quantity sensing means is responsive to a predetermined intermediate quantity of mixture within the chamber to isolate the chamber from low pressure when said predetermined intermediate quantity is reached. The valve seat clearing means clears the inlet valve of solids when flow therethrough ceases. The inlet flow sensor means is responsive to inlet flow of mixture in said inlet duct to actuate the pressure raising means when the said flow stops, so as to provide time for solids to clear the inlet valve before closure thereof.

Preferably, the apparatus includes an outlet duct to receive flow from the outlet valve, with an outlet flow sensor means responsive to the outlet flow in the outlet duct which deactivates the pressure raising means when flow from the outlet valve ceases. Preferably, the inlet and outlet flow sensor means comprise a rotatable paddle extending into the respective duct and mounted for rotation between an undeflected position when there is essentially no flow in the duct, and a deflected position which is responsive to flow of mixture in the duct. Preferably, switch means cooperate with the pressure raising means to activate the pressure raising means when the paddle is in an undeflected position. Preferably, the switch means is magnetically actuated by magnetically responsive means associated with the paddle and the switch means. Also, an air relief means for purging air from the mixture as it leaves the chamber is generally responsive to minimum depth of mixture in an outlet duct extending from the chamber. The relief means has an intake communicating with the outlet duct, and an exhaust vented to atmosphere, with an air relief valve member controlling flow therebetween.

The invention also provides a method of handling a solid/liquid mixture in which the mixture is temporarily stored within a receiving chamber, the method including the steps as follows. An inlet valve is positioned adjacent an upper portion of the chamber above an uppermost level of mixture within the chamber. The chamber is exposed to low pressure to generate a pressure difference across the inlet valve so as to open the inlet valve and draw the mixture into the chamber. When the amount of mixture within the chamber attains a predetermined intermediate quantity, the low pressure is disconnected from the chamber. The method is characterized by sensing when the flow of mixture in an inlet duct adjacent the inlet valve ceases, which permits the inlet valve to clear, prior to increasing pressure in the chamber after the flow of mixture in the inlet duct ceases which closes the inlet valve. When the chamber is pressurized the outlet valve of the chamber is opened to discharge the mixture from the chamber. Preferably, after exhausting the mixture through the outlet valve into an outlet duct, any excess air carried in the mixture into the outlet duct is exhausted to atmosphere.

A directional fluid valve which has particular application in the present invention has a valve body, a valve member, and a magnetically responsive means. The valve body has an inlet port, an outlet port and a main bore, the ports communicating with the main bore. The valve member is mounted within the main bore for movement between first and second positions. The valve member has a clearance means and a closure means to control flow between the ports. A magnetically responsive means is associated with the valve member and is responsive to an adjacent magnetic field to move the valve member from one position to another. Preferably, a magnetically permeable protecting means is positioned adjacent the valve member to provide a cavity for the magnetically responsive means, the cavity having a size to accommodate movement of the valve member between the open and closed positions.

A detailed disclosure following, related to drawings, describes preferred method and apparatus according to the invention, which are capable of expression in method and apparatus other than those particularly described and illustrated.

DETAILED DISCLOSURE

FIG. 1

Figure 1:
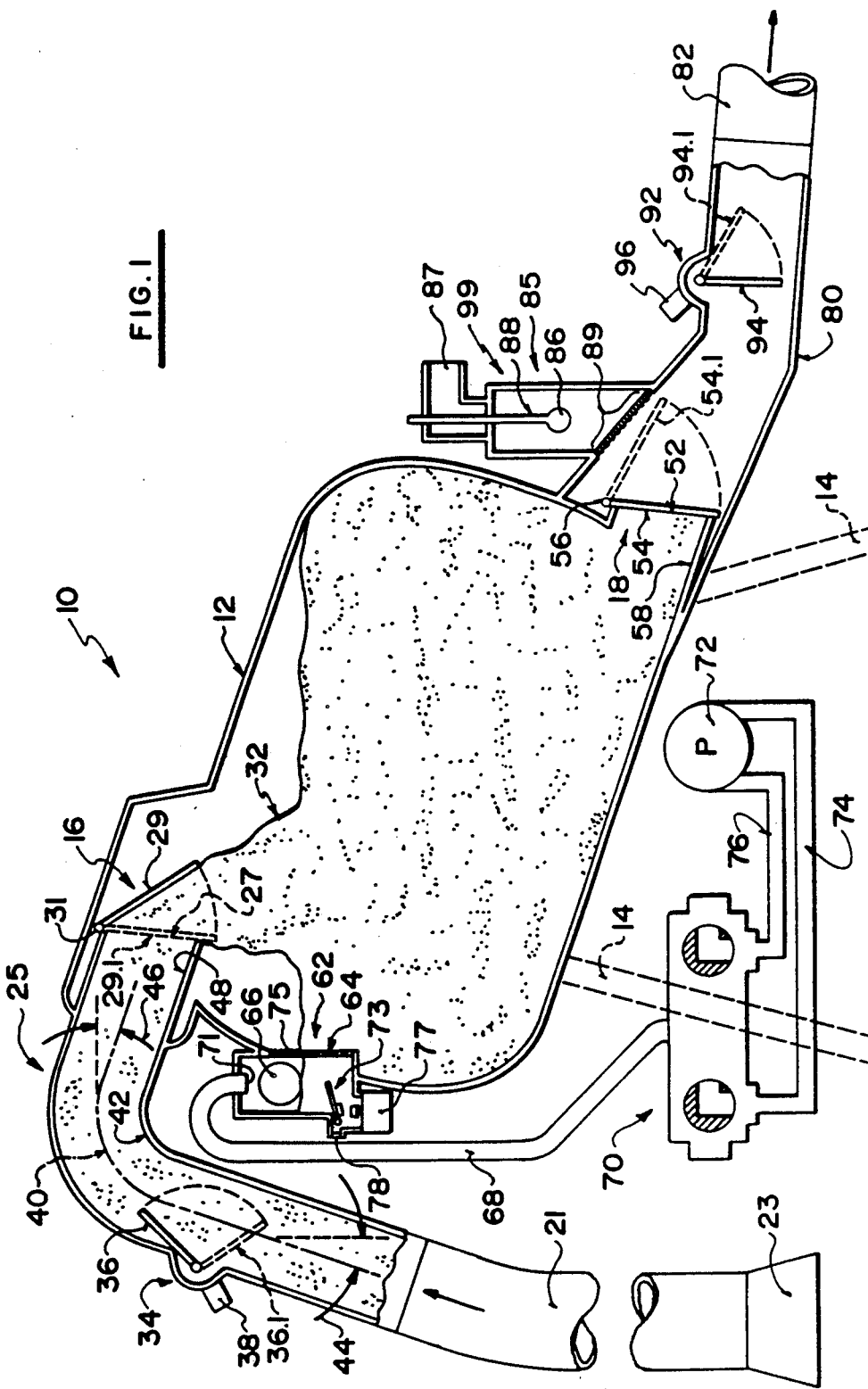
FIG. 1 is a simplified, fragmented side elevation of the apparatus, shown partially schematically with portions removed for clarity, showing the apparatus approximately halfway through an induction mode of a cycle, in which a receiving chamber is exposed to low pressure and flow enters the chamber through an inlet duct thereof.

An apparatus 10 according to the invention has a receiving chamber 12 supported at a desired inclination on a frame 14, shown partially in broken outline. The chamber has an inlet valve assembly 16 and a rigid curved inlet duct 25 at an upper end thereof, and an outlet valve assembly 18 at a lower end thereof. An intake hose 21 has an intake funnel 23 at an outer end thereof, and an inner end connected to the rigid curved inlet duct 25. If necessary, the intake hose 21 can be flexible so that the funnel 23 can be moved within a fish hold, or other container holding fish immersed in water, so as to draw the fish in a fish/water mixture from the hold or container, up the hose 21 and into the chamber 12, when the chamber 12 is subjected to low pressure in an induction mode as will be described.

An inner end of the duct 25 provides an inlet valve seat 27 which is a portion of the inlet valve assembly 16. The assembly 16 also includes an inlet valve plate 29 which is hinged at an upper end thereof to a hinge 31 which permits the valve plate to swing between an open position as shown in full outline, and a closed position as shown in broken outline at 29.1. The valve seat 27 is disposed in a generally vertical plane, or preferably overhanging the vertical plane by a few degrees, and the hinge 31 is relatively free, and thus the plate 29 would tend to hang essentially vertically, closely adjacent the seat 27. The valve plate 29 is displaced to the inclined open position as shown in full lines in FIG. 1 by force of a stream of mixture 32 flowing through the inlet valve 16.

The inlet duct 25 has an inlet flow sensor 34 which has an inlet paddle 36 which can swing between a deflected position shown in full outline which results from mixture flowing through the duct 25, to a non-deflected position as shown in broken outline at 36.1 when there is no flow in the duct 25. The paddle returns by gravity from the deflected position to the undeflected position when the flow ceases. The inlet flow sensor is responsive to flow of mixture in the duct and actuates an inlet flow sensor valve 38 which controls timing of application of high pressure to the chamber as will be described.

The inlet duct 25 has a central duct axis 40 which is generally L-shaped, to provide an apex 42 at an inner corner of the duct. An upstream portion of the duct axis 40 is inclined at an angle 44 to the vertical as shown, and a downstream portion of the duct axis is inclined at an angle 46 to the horizontal as shown. The apex 42 thus causes mixture moving up the duct to move initially upwardly, over the apex, and then to pass downwardly through the inlet valve into the chamber 12. The apex 42 essentially eliminates any fish resting in the duct 25 downstream from the sensor 34 and serves as valve seat clearing means to clear the inlet valve seat 27 of solids as follows A lower surface 48 of the duct adjacent the valve seat 27 is inclined to the horizontal sufficiently to cause any fish that might come to rest thereon to fall under gravity through the valve into the chamber 12. This inclination of the lower surface effectively prevents any fish from resting on the duct surface or across the valve seat when flow through the duct ceases. It is added that the inlet valve 16 is positioned adjacent the upper portion of the chamber which is above an uppermost of level of mixture within the chamber, as will be described with reference to FIG. 3. The downwardly sloping lower surface of the inlet duct adjacent the inlet valve, and the relatively high location of the inlet valve within the chamber ensures that the valve plate can close against the valve seat when required, as will be described.

The outlet valve assembly 18 has an outlet valve seat 52, and an outlet valve plate 54 hinged at a hinge 56 above the seat to permit the plate to swing against the seat to close the outlet of the chamber. Similarly to the inlet valve assembly, the outlet valve seat 52 is disposed in a generally vertical plane, so that the valve plate can hang freely to be closely adjacent the valve seat. The chamber has a lower surface 58 which is inclined to the horizontal to permit fish, assisted by airflow as will be described, to discharge through the valve when open, so as to reduce the chance of fish resting on the outlet valve seat. The valve plate 54 can swing between the closed position as shown in full outline in FIG. 1, and an open position as shown in broken outline at 54.1 when liquid discharges through the outlet of the tank.

The apparatus includes an anti-flooding valve assembly 62 which includes a float chamber or float housing 64 having a float ball 66 therein. The float chamber is located relative to, and communicates with, the main chamber 12. A main pressure conduit 68 cooperates with an upper portion of the chamber 62, and has an upper end providing a conduit valve seat 71 which cooperates with the float-ball 66 so as to define a predetermined intermediate level of liquid within the main chamber 12, ie quantity of mixture, as determined by the density of the float and other variables, to be described with reference to FIG. 3. The conduit 68 has a lower portion which extends to a 5-way pressure control valve 70 which is to be described with reference to FIG. 5. A vacuum pump 72, which serves also as a compressor, has intake and outlet conduits 74 and 76 cooperating with the valve 70 as will be described in FIG. 5.

A lower level sensor means 73 is located adjacent a lower portion of the float chamber 64 and is contacted by the float ball 66 when level in the main chamber drops as the chamber is emptied. The sensor means 73 actuates a level sensor valve or series valve 77 as will be described with reference to FIG. 3. A wall 75 of the float chamber separating the float chamber from the main chamber is perforated in such a way that more perforations are located adjacent the upper portion of the wall 75 than the lower portion In this way, air can escape easily from the upper portion of the float chamber, while fish debris and other contaminants are essentially prevented from entering the float chamber which would otherwise tend to interfere with the level sensor means 73. A low level sensor cleaner 78 cooperates with the means 73 as will be described with reference to FIG. 3.

Figure 2:
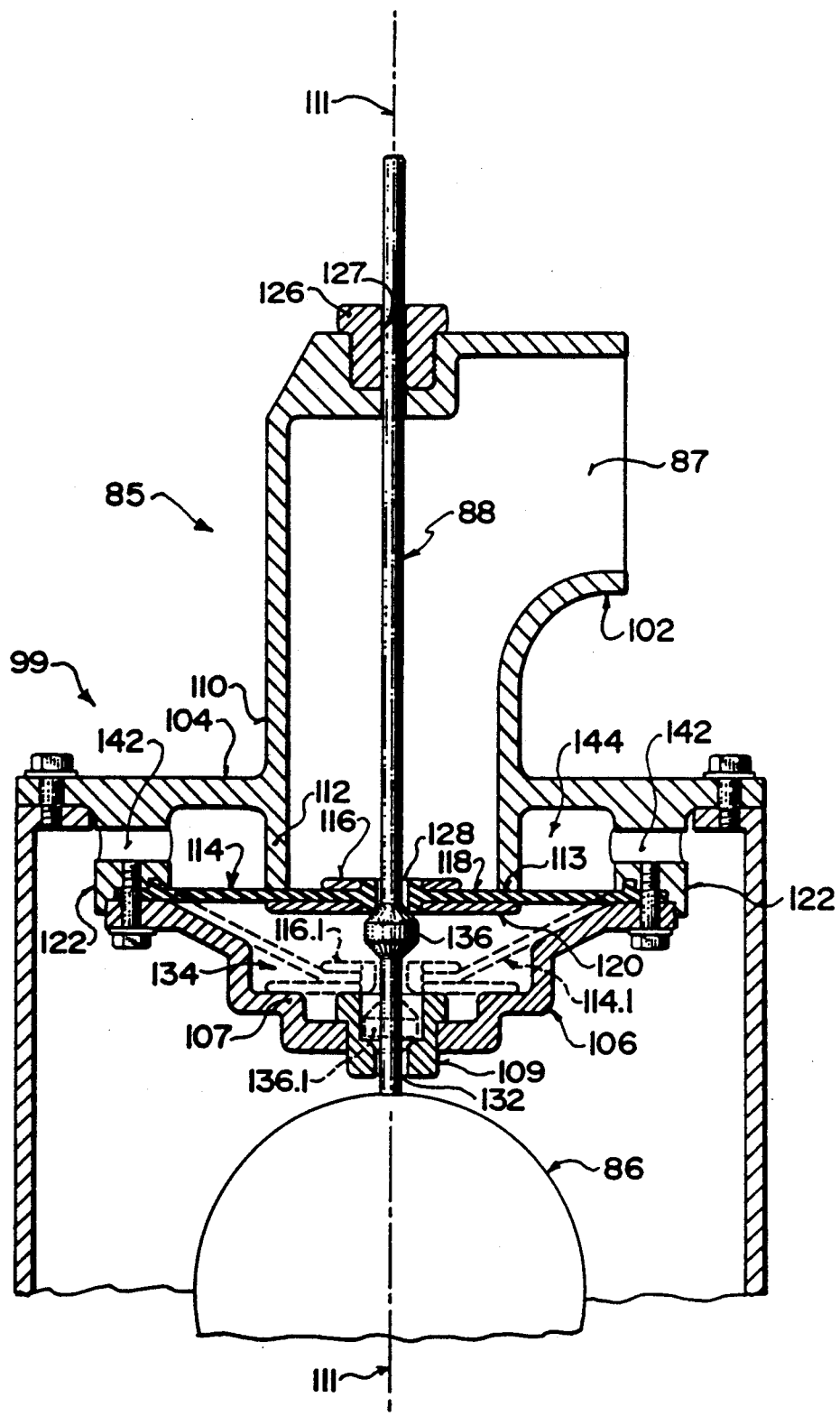
FIG. 2 is a simplified fragmented section in a vertical plane through an air relief means associated with an outlet duct of the apparatus.

The apparatus 10 includes a rigid outlet duct 80 communicating with the outlet valve 18, and a discharge hose 82 is connected to the duct 80 and carries mixture from the apparatus to another location, which can be either above or below the tank 12 as will be described. The outlet duct communicates with an air relief valve assembly 85 which extends upwardly from an upper wall of the outlet duct and has an exhaust vent 87 to discharge air from the duct to atmosphere as will be described with reference to FIG. 2. A portion 89 of the outlet duct wall extending between the relief valve 85 and the duct is perforated to prevent fish and debris from entering the relief valve assembly, while permitting water and air to flow thereinto for purposes to be described. The valve assembly 85 includes a float 86 secured to a lower end of a rod 88 extending downwardly within the assembly 85 to be immersed in liquid discharged from the valve 18.

The apparatus also includes an outlet flow sensor 92 cooperating with the outlet duct 80 which has an outlet paddle 94 which is hinged for rotation about an upper end thereof between an undeflected position as shown in full outline, when there is no flow in the duct, to a deflected position as shown in broken outline at 94.1, which is in response to force from flow within the duct. The paddle 94 actuates an outlet flow sensor valve 96. The inlet and outlet flow sensors 34 and 92 and respective sensor valves 38 and 96 are essentially identical and are described in greater detail with reference to FIG. 4.

FIG. 2

The air relief valve assembly 85 has a relief valve housing 99 having three main components, namely an upper housing 102, an intermediate housing 104 and a lower housing 106, interconnected as shown. The upper housing 102 has the exhaust vent 87 to vent air to atmosphere, and a lower end portion 110 which is cylindrical and concentric with a vertical housing axis 111. The intermediate housing 104 has a hollow cylindrical channel portion 112 which is concentric with the portion 110 and is secured thereto. The portion 112 has a lower edge portion which provides an annular seat 113 of the relief valve assembly, as will be described, and also has an annular outer portion 122 surrounding the portion 112.

The relief valve assembly 85 includes a flexible diaphragm assembly 114 which has an outer periphery sandwiched between the housings 104 and 106 at a connection therebetween. The diaphragm assembly 114 has three layers joined together, namely an upper aluminum layer 116, a middle rubber layer 118, and a lower aluminum layer 120. The upper aluminum layer 116 has a smaller diameter than the lower layer 120, the lower layer 120 having a diameter equal to the seat 113. An intermediate annular portion of the rubber layer 118, disposed between the upper aluminum layer 120 and an outer periphery of the diaphragm provides flexibility for the diaphragm to permit it to move between a raised closed position, as shown in full outline, and a lowered open position as shown in broken outline at 114.1. The lower housing 106 has a circular support portion 107 which supports the lower aluminum layer 120 and therefore supports the diaphragm in its lowered, open position. The housing 106 also includes a lower bushing 109 which projects upwardly sufficiently to be coplanar with the support 107 to similarly support the lower layer 120 of the diaphragm assembly. The bushing 109 has a opening 132 on the axis 111.

The upper housing 102 carries an upper bushing 126 which has an opening 127 fitted with a scraper ring or lip seal and is aligned with the opening 132 of the lower bushing 109, the rod 88 being a sliding fit within the two aligned bores The diaphragm assembly 114 has an opening 128 at the axis to accept the rod 88 therein. The rod 88 and opening 128 have diameters of 6.35 mm (¼ inch) and 11.13 mm (7/16 inch) respectively. Thus the opening 128 is slightly larger than the diameter of the rod 88 to provide a radial clearance of approximately 2.39 millimeters (3/32 inch) between the rod and the diaphragm. The opening 132 in the bushing 109 is about the same diameter as the opening 128 in the diaphragm to provide a similar radial clearance. Except for the clearances at the openings 128 and 132, the lower housing 206 forms an airtight cavity 134 below the diaphragm.

A relief valve member 136 is rigidly attached to the rod 88 and is positioned inside the cavity 134 so as to move with the rod as follows. The member 136 can move from an upper closed position as shown in solid lines, which corresponds with a closed position of the diaphragm 114, to a lower open position, as shown in broken line at 136.1 which corresponds to the open position of the diaphragm. When in the upper closed position, the valve member 136 forms an air and water tight seal with the opening 128 in the diaphragm, and when in the lower position, the valve member forms an air and water tight seal with the opening 132 in the bushing 109. The float 86, connected to the lower end of the rod 88, weighs about 1.82 kilograms (4 pounds) and is of suitable density to float on water. This weight is such that the float falls to its lower position when not supported by water, and when air pressure in the cavity 134 is less than about 1.76 kilograms per square centimeter (25 pounds per square inch). The clearances between the rod 88 and corresponding openings above, and weight of the float 86 are critical, and interrelated. The values specified above have been found by experiment to be suitable for a maximum discharge height above the apparatus of about 16 meters (50 feet). If the weight of the float is changed, or the radial clearance changed, or the height exceeds 50 feet, adjustments will be necessary to attain correct functioning of the relief valve assembly.

The annular outer portion 122 of the intermediate housing 104 has a plurality of radial openings 142 passing therethrough to provide communication between the lower portion of the relief valve assembly, and an annular chamber 144 disposed between the inner and outer portions 112 and 122 of the housing 104. When the diaphragm is in the closed upper position as shown in full outline, the rubber layer 118 forms an air and water tight seal with the seat 113 of the housing 104, preventing air or water from venting to atmosphere through the channel portion 112 and the vent 87. This corresponds to flow of mixture from the outlet valve above a minimum flow or minimum level in the duct. When the diaphragm is in the open position, air from the housing 99 passes through the radial openings 142, into the annular chamber 144, past the seat 113 and into the channel portion 112 and upper portion 102 to atmosphere through the vent 87. This corresponds to low level or essentially zero flow from the outlet valve and provides a means for exhausting air when mixture drains from the assembly 85 as will be described.

FIG. 3

Apparatus within the float chamber establishes lower and intermediate mixture levels 164 and 165 within the main chamber, and the level 165 has a major effect on an uppermost mixture level 166 as will be described.

As previously described, the float chamber 64 of the anti-flooding valve 62 has a perforated float chamber wall 75 separating the interior of the float chamber assembly from the interior of the main chamber 12. The wall 75 has perforations 151 which are spaced closer together towards an upper end of the wall 75 than a lower end thereof, to permit rapid discharge of air through the perforations to increase pressure in the chamber 12 in the discharge mode. If air does not pass sufficiently quickly through the upper perforations 151, the float chamber could be dewatered too quickly, the ball 66 would be unsupported, and it could drop down to a lower portion of the float chamber and actuate prematurely the low level sensor means 73. If this actuation occurred before there was sufficient outlet flow from the chamber 12, the chamber would then be resubjected to low pressure without first being emptied. Consequently, it is important to ensure that air is vented promptly through the upper portion of the wall 75 of the float chamber while there is still sufficient liquid level in the float chamber to support the ball above the low level sensor means 73.

The conduit seat 71 of the conduit 68 is complementary to the float ball 66 so as to provide a seal therewith when the chamber is exposed to low pressure in the conduit 68, and water level in the main chamber 12 rises at least to the intermediate level 165 so that the ball assumes an upper position as shown in broken outline at 66.1. This seal essentially closes off the main chamber 12 from low pressure within the conduit 68 and initiates a sequence of operations as will be described. Preferably, an end portion 153 of the conduit 68 is moveable axially of the float chamber so as to reposition the seat 71 at other locations, an alternative lower location being shown at 71.1 in broken outline. This lower location would result in the ball 66 rising to a lower intermediate level 165.1 and being held at a lower position within the chamber, shown at 66.2. The location of the seat 71 is fairly critical, as it determines the intermediate level of mixture within the chamber 12, which determines the quantity of mixture within the tank when the low pressure within the chamber 68 is cut off or isolated by the ball 66. This determines the final or uppermost mixture level 166, which is below the valve seat 27 (FIG. 1) to prevent trapping of fish in the inlet valve assembly as will be described.

The level sensor 73 at a lower end of the chamber 64 determines the location of the level 164 which is not very critical. The level 164 is established to provide a signal to shift a pressure control switch in preparation for changing pressure in the chamber, but not to initiate the actual change of pressure as will be described. The sensor 73 has a rocker arm 155 having an inner end hinged for rotation about a low friction hinge 156 having a horizontal axis. An outer end 158 of the rocker arm 155 is positioned below the conduit 68 so as to be contacted by the ball float 66 when the ball is unsupported by water within the chamber 64. An intermediate portion of the arm 155 carries an arm magnet 160 which extends below the arm and is adapted to cooperate with a valve magnet 162 of the level sensor valve 77. The valve 77 is a four-way, two-position hydraulic valve having an axially moveable spool which carries the magnet 162 and cooperates with the magnet 160. The actuation of the valve 77 by a magnet is generally similar to two-way, two-position spool valve assemblies of the flow sensors 34 and 92, and serves as an interchanging switch to change pressure within the chamber 12 to be described with reference to FIG. 5.

The low level sensor cleaner 78 has a cleaning nozzle 161 which is located closely adjacent the hinge 156 and is adapted to inject a jet of fluid under pressure generally along the rocker arm 155. The fluid passes above and below the rocker arm to remove any debris that may collect in the lower portion of the housing 64, for example, ice debris from refrigerated fish, which might otherwise prevent the rocker arm from moving downwardly under the weight of the ball 66 as will be described. The float chamber wall 75 has a discharge opening 168 adjacent a lower portion thereof, which is generally aligned with the nozzle 161, so as to receive debris cleared by the nozzle and to permit the debris to be exhausted from the housing.

The fluid can be water, fed from an external pressurized source, not shown, which would merely mix with the mixture in the chamber. Alternatively, the fluid can be air under pressure fed by a separate line, not shown, from the vacuum pump exhaust 72, or alternatively can be from the main conduit 68 passing through a one-way check valve, not shown, between the float chamber 64 and the conduit 68. The check valve is necessary to prevent contamination of air drawn into the vacuum pump 70 when the chamber 12 is subjected to low pressure. As stated previously, it is important that the float chamber is not de-watered prematurely by injecting excessive air. Consequently, if air is injected through the nozzle, the air volume flow should be relatively low to ensure that only debris is cleared from the rocker arm, and that sufficient water remains initially in the float chamber above the arm to ensure that the ball does not drop and contact the arm 155 prematurely as previously described.

FIG. 4

The inlet flow sensor 34 has a flow sensor housing 170 having generally flat, parallel side walls, one side wall 173 only being shown, and a curved connecting wall 175. The housing 170, the sensor valve 38 and the paddle 36 form a unit which is secured adjacent to an opening in the duct 25 (broken outline), so that the paddle projects therethrough into the duct. The inlet paddle 36 extends from a paddle rotor 176 which is journalled for rotation about a paddle axis 178 by means of low friction journals, not shown, mounted in the side walls. A paddle magnet 180 is mounted on the paddle rotor 176 in a position which is generally diametrically opposite to the paddle 36. Preferably, the paddle rotor 176, the paddle magnet 180 and paddle 36 are integrally molded in a suitable plastic, with low friction journals molded within the plastic on the axis 178. The paddle is flexible so as to deflect when struck by a fish so as to essentially eliminate damage to the fish. The rotor has a circumference provided with a generally radially inclined shoulder 181, and the housing 170 has an inwardly projecting shoulder 183. The shoulders 181 and 183 are positioned relative to each other so as to interfere with each other when the rotor swings to a position 176.1 shown in broken outline in FIG. 4 which occurs when the paddle 36 is moved to the deflected position 36.1 by flow within the duct. In this deflected position, a magnet axis 179 extending from the axis 178 to a midpoint of the magnet 180 assumes a specific axis position 179.1 as will be described.

Figure 4:
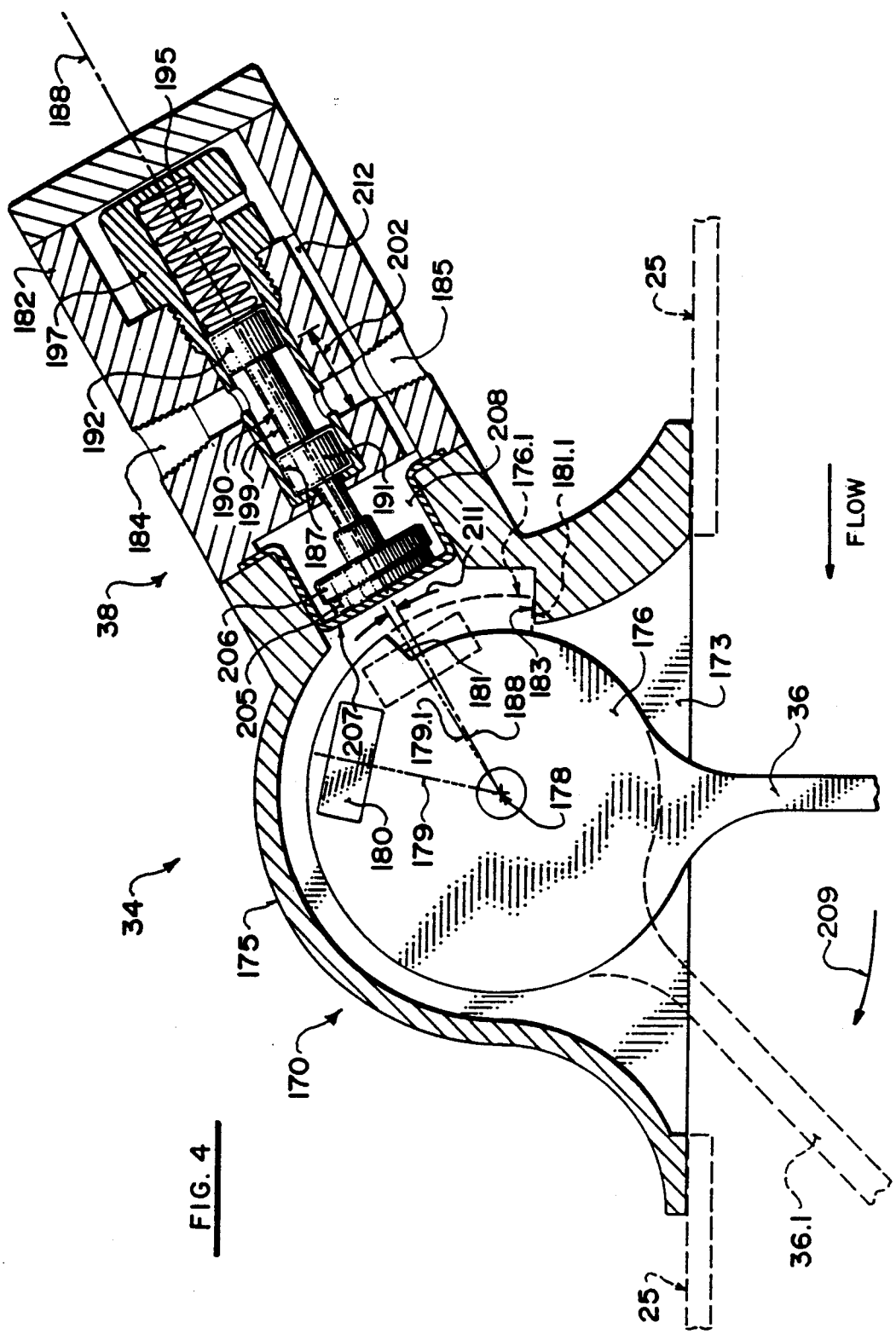
FIG. 4 is a simplified fragmented section in a vertical plane through a flow sensing means and associated switch means of the invention.

The inlet flow sensor valve 38 has a valve body 182 having an inlet port 184, an outlet port 185 and a main bore 187, the ports communicating with the main bore. The main bore has a main axis 188 which, when projected, intersects the paddle axis 178 although this is not critical. The valve assembly includes a valve spool 190 mounted for axial movement within the bore between an open or first position, as shown, and a closed or second position in which the valve spool moves upwardly to the right as seen in FIG. 4. The valve spool is generally cylindrical and has first and second end portions 191 and 192 which are generally complementary to the main bore. The first member serves as a closure means to close the outlet port 185 when the spool is in the closed position, not shown. A valve spring 195 is interposed between the second end portion 192 of the valve spool and an internal end cap 197 of the valve assembly. The valve spool has a reduced diameter portion 199 which has a diameter less than the diameter of the end portions and serves as a clearance means. The inlet and outlet ports are spaced axially along the main bore by a port spacing 202, and axial length of the clearance means approximates to the port spacing to permit transfer of fluid between the ports when the spool is correctly positioned axially relative to the port in the open position as shown. The spring 195 serves as a biasing means cooperating the valve spool to urge the spool to the open position, i.e. to form a "Normally Open" valve, however it could be re-positioned for other purposes.

A valve magnet 205 is mounted on a magnet holding means 206 which extends outwardly and axially from the first end portion 191. The valve assembly includes a magnetically permeable housing 207 extending from an end thereof adjacent the first end portion of the spool, which encloses the magnet to isolate the magnet 205 and the valve 38 from material within the duct 25 and the housing 170. Isolating the valve and associated structure from the solid/liquid mixture prevents not only the mixture from contaminating the valve, but also prevents any leakage from the valve from contaminating the mixture. This is particularly important when handling food products such as fish. The housing 207 serves as a magnetically permeable protecting means to provide a magnet cavity 208 for the magnet 205, the cavity having an axial length which is at least equal to movement of the spool between the open and closed positions.

The paddle magnet 180 and the valve magnet 205 are positioned so that like poles thereof are closely adjacent each other when, in response to force of flow against the paddle, the paddle 36 swings in direction of an arrow 209 through approximately 45° from the position shown in full outline to the position 36.1, to bring the magnets 180 and 205 closely adjacent each other. It is noted that, when the shoulder 181 contacts the shoulder 183 as shown in broken outline at 181.1, the magnet axis 179 on the rotor and the main axis 188 of the valve are inclined to each other at an angle 211, which is approximately between 3 degrees and 5 degrees from a position in which the axes would be aligned at a position of minimum spacing, i.e. maximum force, between the magnets. Thus, interference between the shoulders 181 and 183 prevent the magnets from attaining the minimum spacing from each other. This is to ensure that the rotor and magnet cannot swing past a minimum spacing position, that is to an over-centered position, which might prevent the magnets from passing each other again in the reverse direction, so as to attain an undeflected position. It can be seen that the shoulders 181 and 183 serve as paddle stop means to prevent movement of the paddle past a minimum spacing position so as to prevent over-centering of the paddle. The magnet 180, which is maintained in the new position by force of fluid acting on the paddle 36 has sufficient strength to repel the magnet 205 radially outwardly, thus shifting the valve spool outwardly against the spring 195 to the closed position, not shown. A relief conduit 212 communicates with a portion of the main bore containing the spring 195, the outlet port 185 and the the housing 207, so as to relieve any hydraulic lock that might otherwise occur and to drain leakage.

In contrast with prior art valve spools known to the inventor, the valve spool 190 is not provided with O-ring seals on the first and second end portions. Instead, the valve bore has a diameter which is sufficiently greater than the diameter of the valve member to produce a radial clearance therebetween. This permits hydraulic fluid leakage between the valve bore and the valve spool to completely flood the spool and conduits to prevent formation of air pockets. This reduces chances of seizure of the valve spool within the bore when the apparatus is inoperative for a long time.

It is noted that the paddle 36 actuates the valve 38 without any direct contact therebetween. Use of a magnetic field to actuate valves has the advantage that direct mechanical contact is avoided, which eliminates linkages, etc. that would normally be required for connecting the paddle 36 to the valve. Such linkages would normally be prone to collecting debris from the fish, as well as being exposed to the salt water. Use of magnets in this application has many advantages, particularly the simplification of interfacing between the flow sensor and the valve controlled by the flow sensor. This is particularly important in marine fishing applications in the highly corrosive environment of salt water where most mechanical components, if left unattended and coated with salt water, or with highly adhesive fish debris, are rapidly prone to seizure which would then require servicing prior to operation of the machine.

FIG. 4 discloses a two-way, two position or on/off valve which is used for the inlet and the outlet flow sensors 34 and 96 respectively. The level sensor or series valve 77 is a four-way, two-position valve in which the pairs of ports are interchanged between the two positions. Thus, the valve 77 serves as an interchanging switch means, as opposed to an on/off switch means, and thus does not have an open or closed position as described for the valve 38. Clearly, the spool means of the valve 77 shifts between first and second positions to control flow between the ports and, being actuated magnetically, is considered equivalent to the on/off flow sensor valves.

Figure 5:
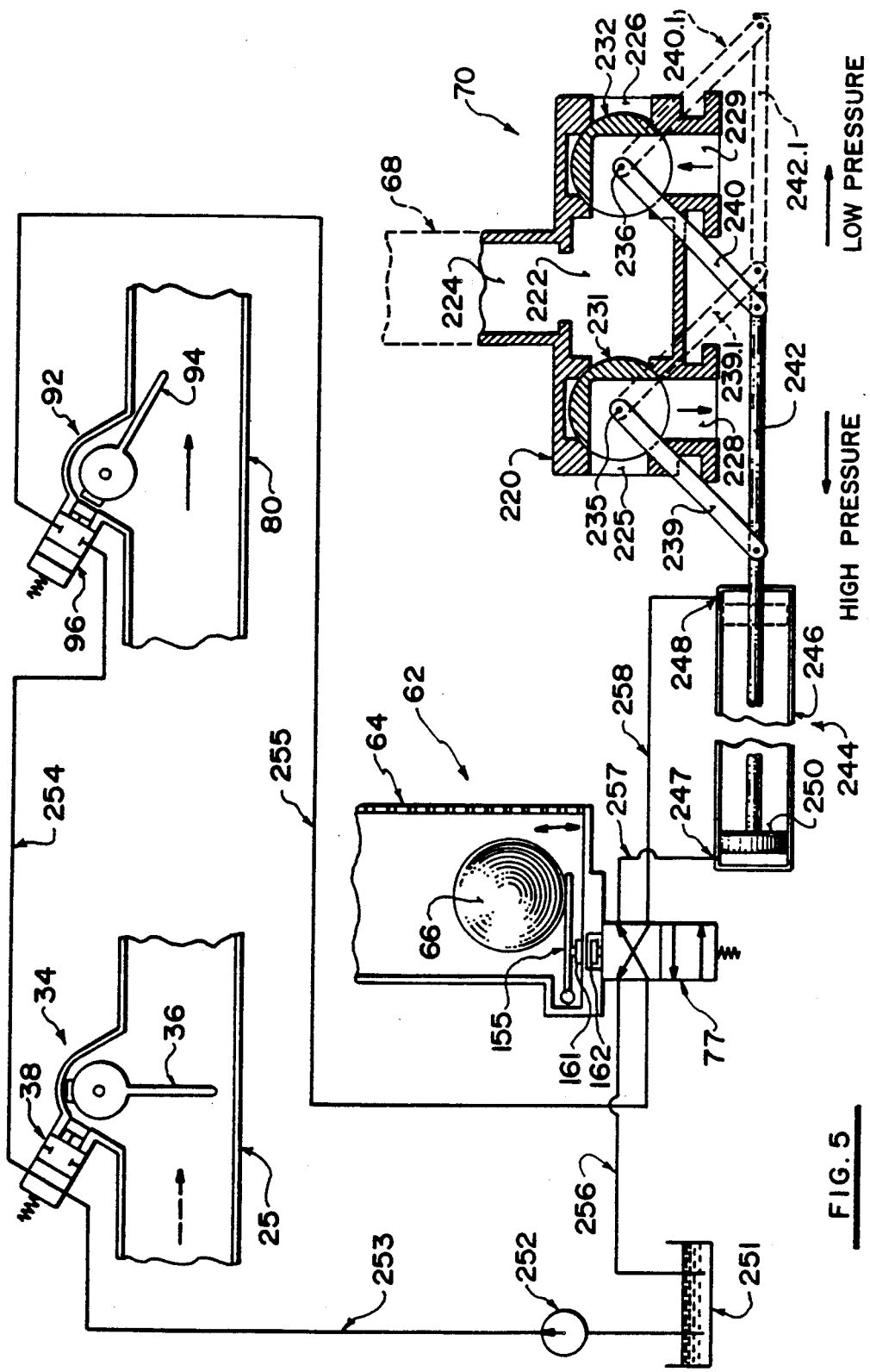
FIG. 5 is a simplified hydraulic schematic showing hydraulic components associated with three sensors of the apparatus and a pressure changing control means, the apparatus being shown approximately midway through a discharge mode of a cycle of the apparatus.

FIG. 5, with references to FIG. 1

The pressure control valve 70 has a body 220 having a body cavity 222 communicating with five ports as follows: a main conduit port 224 which communicates with the conduit 68, first and second vent ports 225 and 226 communicating with atmosphere, and a high pressure port 229 communicating with the outlet conduit 76 (FIG. 1) from the vacuum pump 72, which functions as a compressor, and a low pressure port 228 communicating with the intake conduit 74 (FIG. 1) of the vacuum pump 72. The ports 225 and 228, and the ports 226 and 229 are disposed radially to each other at 90 degrees apart. First and second valve members 231 and 232 are journalled for rotation about first and second valve member axes 235 and 236 respectively to selectively open and close vent ports and pressure ports respectively. The valve members have undesignated clearance portions which permit communication between ports disposed at 90 degrees to each other as follows. The first valve member 231 is shown in a position in which the pump inlet receives air from the port 228 which was drawn through the vent port 225 from atmosphere. The second valve member 232 is shown with the body cavity 222 exposed to high pressure from the pump outlet discharged through the port 229, thus exposing the main conduit port 224 and the conduit 68 to high pressure.

The first and second valve members 231 and 232 have first and second valve levers 239 and 240 respectively which extend parallel to each other to cooperate with a piston rod 242 of a valve actuating cylinder assembly 244. The cylinder assembly 244 has a cylinder body 246 having first and second cylinder ports 247 and 248 respectively, and a piston 250 attached to an inner end of the piston rod. Clearly, from the retracted position shown in full outline, admitting fluid into the cylinder port 247 and exhausting fluid from the cylinder 248 port extends the piston rod, swinging the levers 239 and 240 from a first position, shown in full outline in FIG. 5 with the piston rod retracted, to respective second positions 239.1 and 240.1, shown in broken outline, in which the piston rod is in an extended position 242.1.

FIG. 5 is also a fluid schematic showing control fluid connections between the main directional valve 70, the inlet and outlet flow sensor valves 38 and 96 respectively, and the level sensor or series valve 77. A hydraulic fluid pump 252 supplies fluid from a sump 251 under pressure to the valve 38 through an outfeed conduit 253. A first valve conduit 254 extends from the inlet sensor valve 38 to the outlet sensor valve 96. A second valve conduit 255 extends from the valve 96 to connect with a corresponding port in the liquid level sensor valve 77. Thus, the inlet and outlet flow sensor valves receive fluid under pressure in series as shown and serve as on/off switches to control other structures. A return conduit 256 returns fluid from the valve 77 to the sump 251. First and second actuator conduits 257 and 258 extend from the first and second ports 247 and 248 of the actuating cylinder 244 to respective ports in the level sensor valve 77.

As previously stated, the valve 77 is a two-position, four-way spool valve which is magnetically actuated by magnets 161 and 162 similarly to the inlet and outlet flow valves, but has a known spool and porting structure which permits port interchanging function similar to many prior art two-position, four-way valves and thus is not described in detail.

FIG. 5 depicts a status of the apparatus sometime after initiation of a discharge mode in which the valve actuating cylinder assembly 244 is retracted as shown in full outline. In this position the high pressure port 229 is exposed to the outlet from the pump and directs high pressure air to the port 224 and to the conduit 68. The port 228 is exposed to atmosphere and the intake of the vacuum pump.

Referring now to FIG. 1, high pressure in the conduit 68 passes air into an upper portion of the chamber 12 by displacing the anti-flooding float ball valve 66 away from its seat 71, and generating a positive pressure in the chamber 12. This causes the inlet valve plate 29 to close against the seat 27 shown (in broken outline at 29.1), thus closing the inlet valve 16. In this condition, there is no flow in the inlet duct 21, and thus the inlet paddle 36 hangs freely in the lowered position, shown in broken outline at 36.1. The outlet valve plate 54 has swung outwardly under the influence of flow through the outlet valve 88 to attain the open position 94.1, shown in broken outline. The outlet flow sensor 96 is thus displaced to the deflected position shown in broken outline at 94.1, and the ball float 86 rises upwardly due to buoyancy from the stream of fluid leaving the chamber 12 through the outlet valve 18.

OPERATION

Referring again to FIG. 1, when the apparatus 10 is inactive the inlet and outlet paddles 36 and 94 would normally hang freely generally vertically, the inlet paddle being shown in such a position at 36.1. Similarly, the inlet and outlet valve plates 29 and 54 hang generally vertically as shown for the inner valve plate in broken outline at 29.1, and in full outline for the outlet valve plate 54. The float ball 66 of the anti-flooding valve 62 is in a lowered position, resting on the rocker arm 165, see FIGS. 3 and 5. In this position, the magnets 161 and 162 repel each other so as to set the series valve 77 in a position as shown in FIG. 5 in which the second valve conduit 255 is connected, through the series valve 77, to the first port 247 of the valve actuator cylinder, and the port 248 of the valve actuator cylinder is connected to the sump 251. The valve levers 239 and 240 are in positions as shown in full outline in FIG. 5 as a result of a previously applied high pressure to the chamber.

Referring to FIG. 5, when the apparatus is switched on, the pump 252 supplies pressurized fluid to the conduit 253, which passes in sequence through the opened valves 38 and 96, and enters the series valve 77 through the conduit 255. Pressurized fluid leaves the valve 77 and enters the port 247 of the actuator cylinder 244, extending the piston rod 242 thereof, and associated valve levers to broken outline positions 242.1, 239.1 and 240.1 respectively. Thus, the valve members 231 and 232 are swung through 90° to new positions, not shown in FIG. 5, in which suction from the pump is applied through the port 228 to the main conduit port 224, and exhaust from the pump passes to atmosphere through the ports, 229 and 226.

Thus, referring to FIG. 1, the main conduit 68 is subjected to low pressure which opens the inlet valve 16 of the main chamber, and closes the outlet valve 18. Low pressure within the chamber 12 draws the fish/liquid mixture up the intake hose 21, and over the apex 42 and downwardly through the inlet valve 16 into the chamber 12. Flow of the mixture through the inlet duct 25 displaces the inlet paddle 36 to the deflected position as shown in full outline in FIG. 1. This causes the magnets to swing towards each other, assume the relative position as shown for the valve 96 in FIG. 5, thus repelling the spool and closing the valve 38. Then high pressure fluid in the line 253 is now stopped at the first valve 38, and the series valve 77 is no longer exposed to high pressure fluid.

Figure 3:
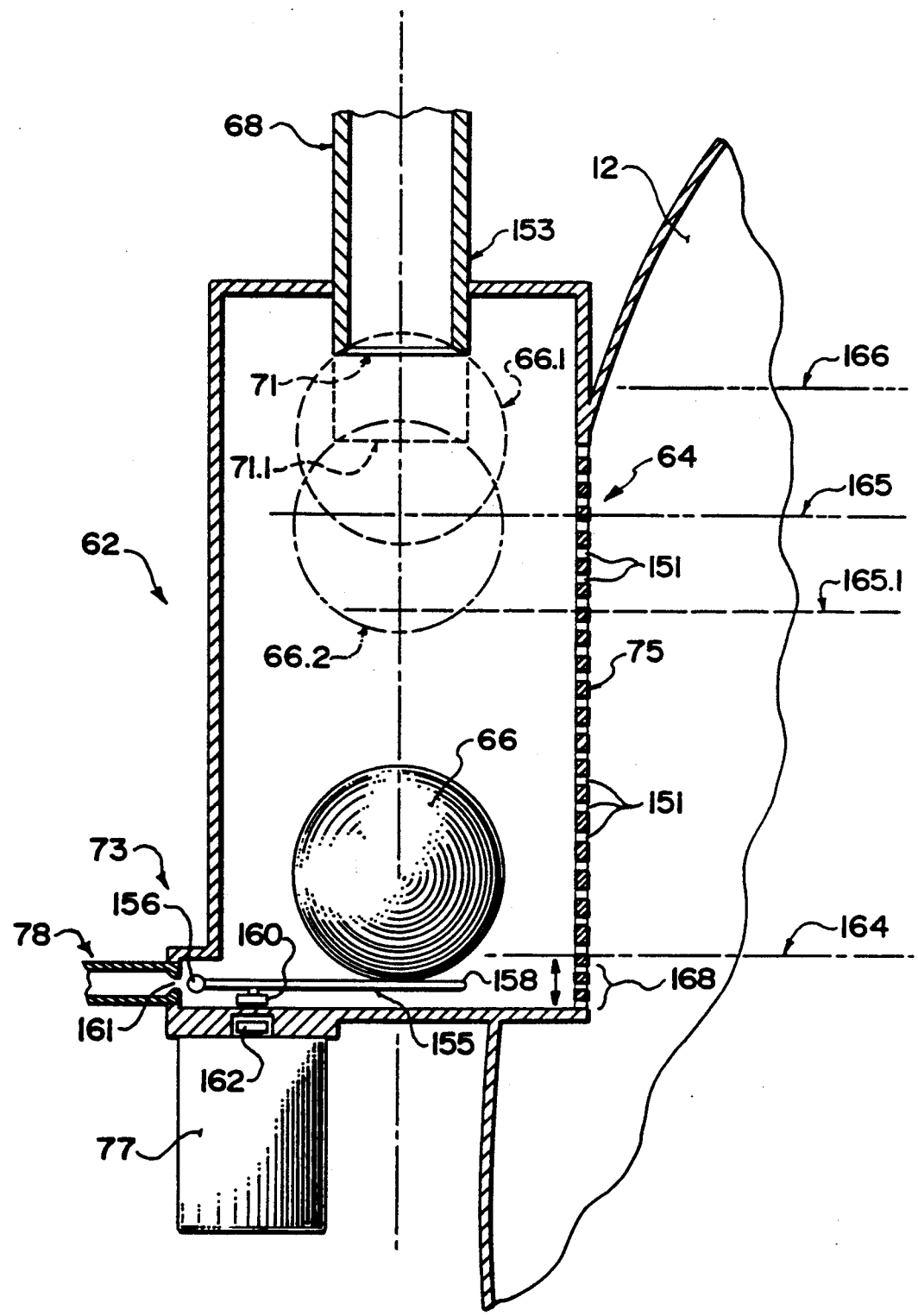
FIG. 3 is a simplified fragmented section in a vertical plane of a quantity sensing means associated with the receiving chamber of the apparatus.

As liquid level in the chamber 12 rises to the lower level 164, the ball 66 gradually floats upwardly off the upper end of the rocker arm 155. As the rocker arm becomes unweighted, force from the valve spring (not shown) and the valve magnet 162 is sufficient to repel the magnet 161, which forces the rocker arm 155 upwardly, and the return spring of the valve 77 shifts the spool to a second position thereof, not shown in FIG. 5. In the second position, the connections to the ports 247 and 248 are interchanged, so that conduit 255 is now connected to the second cylinder port 248, and the first cylinder port 247 is connected to the sump. However, because there is no pressure in the line 255, the cylinder rod 242 does not move from its extended position, which is shown in broken outline at 242.1 in FIG. 5. In effect, the series valve 77 has been set to interchange the ports of the actuating cylinder 244, but the actuating cylinder cannot move until a particular flow condition is sensed. The actual change of the apparatus operating mode occurs when flow in the inlet duct ceases and the liquid level in the chamber attains the uppermost liquid level 166 as seen in FIG. 3.

Meanwhile, the liquid level in the chamber 12 continues to rise and eventually the float ball 66 seats against the seat 71 of the main conduit 68, closing off low pressure applied to the chamber 12. This occurs at the intermediate liquid level 165 in the chamber 12, as seen in FIG. 3, which level tends to control the uppermost level of liquid 166 that is attained in the chamber as will be described. It can be seen that the float ball 66 in combination with the valve seat 71 serve as quantity sensing means responsive to the predetermined intermediate quantity of mixture within the chamber to isolate the chamber from low pressure when the predetermined intermediate quantity is reached.

When the vacuum port or conduit seat 71 is closed by the ball 66, there is still residual low pressure in the chamber which continues to draw liquid up the duct 25 and into the chamber 12. Thus, the chamber continues to fill after the vacuum has been disconnected due to the said residual low pressure in the chamber and also momentum of fluid in the duct. Pressure differential across the inlet valve reduces continually as the chamber continues to fill, and at some point there is insufficient momentum in the flow in the duct, or pressure differential across the valve, to maintain the flow over the apex 42. This causes the flow in the intake hose 21 to fall backwardly, which permits the inlet paddle 36 to swing to the broken outline position at 36.1 as shown in FIG. 1 The lower surface 48 of the duct clears rapidly of fish permitting the valve plate 29 to close against the seat 27. At this instant, level of liquid within the chamber is approximately at the uppermost level 166, FIG. 3. This is a maximum or uppermost level of liquid reached in the chamber and will vary somewhat, but is always below level of the inlet valve 16. In this way, solids within the chamber 12 cannot interfere with closure of the inlet valve plate 29. As indicated above, any fish that might have a tendency to come to rest on the apex 42 would tend to fall forwardly into the chamber by sliding along the lower surface of the duct, or backwardly into the inlet hose 21. This ensures that the valve seat 27 and plate 29 are maintained free and clear of obstructions permitting it to seat securely.

When the inlet paddle 36 swings to the undeflected position shown in FIG. 1 at 36.1, the inlet flow valve 38 is again opened and discharges fluid under pressure to the valve 96 and then to the series valve 77. The valve 77 has already been shifted by release of weight of the ball, which is held against the seat 71 by low pressure and buoyancy forces. Flow from the sensor valves 96 and 38 now passes through the valve 77 and into the second actuator conduit 258, which retracts the piston rod 242 and swings the levers 239 and 240 to the full outline position shown in FIG. 5. When the full outline position in FIG. 5 is attained, the high pressure port 229 is opened to outlet from the pump, which feeds pressurized air from the main conduit 68 in to the anti-flooding chamber, displacing the ball 66 from the seat thereof. Air under pressure rapidly passes through the perforations 151 in the wall 75 between the two chambers, and pressurizes the remaining air space in the chamber 12 which causes the valve plate 29 to close (as shown in broken outline in FIG. 1 at 29.1). Thus it can be seen that the inlet paddle 36 and the flow sensor valve 38 of the inlet flow sensor means are responsive to inlet flow of mixture to activate the pressure raising means when said flow stops, so as to provide time for solids to clear the inlet valve before closure thereof.

As pressure in the chamber 12 rises, the outlet valve plate 54 swings open (as shown in broken outline at 54.1), permitting the mixture to discharge from the chamber into the discharge duct 80. The outlet flow paddle 94 is now displaced to the inclined position shown at 94.1 in FIG. 1, which closes the valve 96 thus trapping pressurized fluid within the line 254 (FIG. 5) and isolating the valve 77 from pressure.

As level of liquid within the chamber 12 lowers, the float ball 66 simultaneously lowers, until it reaches the level 164 and contacts the rocker arm 155 (FIG. 3). If any ice flakes or debris has accumulated adjacent the rocker arm 155, fluid under pressure is applied to the cleaning nozzle 161, which clears the rocker arm and discharges any ice or debris through the discharge opening 168 into the receiving chamber. As the weight of the ball is applied to the arm, the arm swings downwardly and the magnets repel each other, thus shifting the series valve 77 to the position as shown in FIG. 5. However, shifting the series valve 77 has no immediate effect as the valve 77 is isolated from pressurized fluid, as the valve 96 is now closed. However, the direction of flow to the ports in the cylinder 244 have now been interchanged, and are set to change application of pressure to the chamber 12 when required.

When the chamber is empty, flow passed the outlet valve paddle 94 ceases, and the paddle swings to a vertical position as shown in FIG. 1. This opens the valve 96 which then supplies pressurized fluid through the conduits 255 and 257 into the first cylinder port 247. This now extends the piston rod to deactivate the pressure raising means, so that the actuator assumes a position shown in broken outline in FIG. 5, and once again low pressure is applied to the chamber 12.

As can be seen, the valve actuating cylinder means 244, the pressure control valve 70, the vacuum pump 72 and interconnecting structure serve as means for raising pressure and means for lowering pressure within the chamber. Also, the float 66, the rocker arm 155 and level sensor valve 77 and associated structure serve as mode selecting means for selecting mode of operation of the apparatus. The mode selecting means is responsive to quantity of mixture within the chamber and selectively controls the pressure lowering means and pressure raising means to control application of pressure to the chamber so as to lower pressure in the chamber in the induction mode and to raise pressure in the discharge mode. It can be seen that the outlet valve is responsive to pressure in the chamber so as to close upon lowering of pressure in the chamber to hold the mixture in the chamber, and to open upon raising of pressure in the chamber so as to discharge the mixture from the chamber.

It can be also seen that the float is constrained for movement relative to the valve seat between upper and lower portions of the housing in response to changes of level of mixture within the receiving chamber. The quantity sensing means is thus responsive to a predetermined lower quantity of mixture within the chamber, namely the lower level 164, and is adapted to select a subsequent mode of operation of the apparatus when the lower quantity of mixture is attained, whether the level is rising or falling, in order to prepare the apparatus for a change in pressure in the chamber. Clearly, the mode selecting means cooperates with the inlet flow sensor through the conduits 254 and 255 so as to expose the chamber to high pressure when flow in the inlet duct ceases, so as to initiate the discharge mode of the apparatus. The mode selecting means also cooperates with the outlet flow sensor through the conduit 255 so as to expose the chamber to low pressure when the flow in the outlet duct ceases, to initiate an induction mode.

The air relief valve assembly 85 exhausts any undesirable air from the chamber 12 and outlet duct 80 to atmosphere, to prevent substantial quantities of air passing with the mixture discharged through the discharge duct. Pressure in the discharge duct forces water upwardly through perforations in the wall 89 into the relief valve housing 99, raising the float ball 86 to attain the raised position shown in FIG. 2. In the raised position, the diaphragm 114 assumes the full outline position as shown, and seals the hollow cylindrical channel 112 around the seat 113, preventing air or water from passing through the vent 87. In addition, the diaphragm 114 is urged to its closed position by pressure in the housing 99, which passes through the opening 132 and is higher than atmospheric. Because surface area of a lower surface of the diaphragm 114, which is exposed to pressure in the housing 99 and cavity 134, is greater than upper annular surface area of the diaphragm exposed to the same pressure in the chamber 144, sealing of the diaphragm against the seat 114 is augmented. This prevents air or water from flowing to atmosphere through the cavity 142. Note that the opening 128 in the diaphragm is blocked by the valve member 136 thus maintaining pressure in the cavity 134.

As the flow of water from the chamber 12 is reduced, the level of water in the duct 80 lowers and the float ball 86 tends to drop until the valve member 136 contacts the lower bushing 109. When the valve member 136 drops, the opening 128 in the diaphragm is now exposed to the exhaust vent 87, so that air below the diaphragm is now under atmospheric pressure through the opening 128. Air at a higher pressure from within the housing 99 passes through the radial openings 142 into the annular chamber 144 above the diaphragm. This applies an increased pressure on the upper surface of the diaphragm, and deflects the diaphragm downwardly to the broken outline position 114.1 as shown, permitting the air to exhaust rapidly through the channel member 112 and to the vent 87.

In summary, it can be seen that the air relief valve assembly 85 is generally responsive to a minimum level of water in the duct 80, that is a level sufficient to raise the float 86 to close the diaphragm 114, and vice versa. The diaphragm and the corresponding seat 113 provide the air relief valve means which has an intake, i.e. the perforated wall portion 89 communicating with the outlet duct 80, an exhaust vent 87 vented to atmosphere, and an air relief valve, i.e. the diaphragm etc., controlling flow therebetween. The float 86 communicates with mixture in the outlet duct so as to float on the mixture when flow of the mixture from the chamber is above a minimum level, and to move to a lower level when flow from the chamber is below the minimum level. The float cooperates with the air relief valve member to open and close the diaphragm as required.

ALTERNATIVES

The apparatus has been disclosed for use with an automatic valve sequencing system, in which flow sensors in either the inlet duct or the outlet duct detect when flow therein ceases, which then applies either low pressure or high pressure to the chamber 12 to initiate the next stage or mode of the cycle. For some applications requiring particular delicacy of control, manual operation might be preferred, and this can be accomplished by disconnecting or eliminating by use of alternative valves the inlet and outlet flow sensors, the level sensor and associated circuitry, and instead monitoring visually cessation of the flow in the ducts. The pressure control valve 70 can be shifted manually or by hydraulic or electrical means or equivalents.

The apparatus has been disclosed for use with a single receiving chamber, in which a single vacuum pump can be used, and in which the intake to the pump provides a low pressure source, and the outlet from the pump provides a high pressure source. Efficiency can be increased by providing twin chambers which are fed from a common intake hose, which is bifurcated to feed two separate flows, as required, into the rigid inlet ducts 25 of each chamber. In a twin chamber embodiment, not shown, a first chamber is exposed to low pressure and receives the flow from the hose and through one branch of the bifurcated duct, while the second chamber is subjected to high pressure and is discharging a previously received load. With twin chamber operation a separate compressor and vacuum pump is required.

While the invention is disclosed using a hydraulic circuit for controlling pressure cycles of the chamber 12 by using three two-position hydraulic spool valves, other control circuits are envisaged. For example, an electrical circuit using magnetically actuated switches as a substitute for the two-position hydraulic valves can be substituted.

The flow sensor valves 38 and 96, and the level sensor valve 77 are axially slidable spool valves which are magnetically actuated by close proximity to a magnet, in which like poles of the magnets are disposed to be closely adjacent each other. A magnetically permeable wall is interposed between the two magnets, so as to isolate the valve structure from contaminants in the environment of the other magnet and vice versa. This has many advantages over valves which require a direct mechanical connection to actuate the spool valve. However, because forces obtainable from the magnets are relatively low, a relatively low spring force to return the spool is required when the paddle magnet is remote. Preferably, any O-ring seals are eliminated and a small leakage of fluid is also desirable to reduce forces involved in shifting the spool. The benefits of this type of valve actuation can also be attained by use of two magnets in which unlike poles are adjacent each other, that is the magnets would attract each other. This would require repositioning of the valve spring. Also, in some applications it might be preferable to eliminate one magnet, and merely to provide an armature of ferromagnetic material or magnetically responsive means to be attracted to the remaining magnet.

While the valve is shown as an axially slidable spool valve, it would be possible to obtain the benefits of this invention by incorporating at least one magnet in a rotary valve to obtain similar effects which permit actuation of the valve "at a distance" without direct mechanical contact. While the valve is shown for use with a fish pump, clearly it has applications in many other areas where valve actuation cannot be attained with direct mechanical contact, and electrical or other means are not desirable.

We claim:

1. An apparatus for handling a solid/liquid mixture, comprising:
    (a) a receiving chamber adapted to receive the mixture from an inlet duct in an induction mode and to hold the mixture temporarily prior to discharging the mixture in a discharge mode,
    (b) the chamber having inlet and outlet valves, the inlet valve communicating with the inlet duct to receive the mixture and being positioned adjacent an upper portion of the chamber above an uppermost level of the mixture within the chamber, the inlet valve being responsive to a pressure difference between the inlet duct and the chamber to open and close the inlet valve,
    (c) pressure lowering means for lowering pressure in the chamber to expose the inlet valve to a pressure difference so as to open the inlet valve and draw a mixture therethrough in the induction mode, (d) pressure raising means for raising pressure in the chamber in the discharge mode which tends to close the inlet valve, (e) quantity sensing means responsive to a predetermined intermediate quantity of mixture within the chamber, the quantity sensing means cooperating with the pressure lowering means so as to isolate the chamber from low pressure when said predetermined intermediate quantity is reached, (f) valve seat clearing means to clear the inlet valve of solids when flow therethrough ceases, and (g) an inlet flow sensor means responsive to inlet flow of mixture in said inlet duct, the inlet flow sensor means cooperating with the pressure raising means to activate the pressure raising means when the said inlet flow stops, so as to provide time for solids to clear the inlet valve before closure thereof.

2. An apparatus as claimed in claim 1 further including:
(a) an outlet duct to receive flow from the outlet valve, and an outlet flow sensor means responsive to the outlet flow in the outlet duct so as to deactivate the pressure raising means when the flow from the outlet valve ceases.

3. An apparatus as claimed in claim 1, in which the flow sensor means comprises:
(a) a rotatable paddle extending into the inlet duct and mounted for rotation between an undeflected position when there is essentially no flow in the duct, and a deflected position which is responsive to flow of mixture in the duct,
(b) a switch means cooperating with the pressure raising means to activate the pressure raising means when the paddle is in an undeflected position.

4. An apparatus as claimed in claim 3 further comprising:
(a) a first magnetically responsive means associated with the paddle and being rotatable therewith,
(b) a second magnetically responsive means cooperating with the switch means so as to actuate the switch means as the paddle rotates in response to flow in the inlet duct,
(c) at least one of the magnetically responsive means is a permanent magnet so as to generate a force on the remaining magnetically responsive means without contact therewith.

5. An apparatus as claimed in claim 4, in which:
(a) the rotatable paddle returns by gravity from the deflected position reflecting flow past the paddle, to an undeflected position reflecting negligible flow past the paddle,
(b) the first magnetically responsive means is positioned relative to the paddle so as to approach a generally minimum spacing relative to the second magnetically responsive means when there is flow in the duct.

6. An apparatus as claimed in claim 5, further including:
(a) paddle stop means to prevent movement of the paddle past a minimum spacing position so as to prevent over-centering of the paddle.

7. An apparatus as claimed in claim 4, further including:
(a) a magnetically permeable protecting means cooperating with the switch means to provide a cavity to enclose the second magnetically responsive means, the cavity having a size to accomodate movement of the second magnetically responsive means between open and closed positions of the switch means, and isolating the switch means and second magnetically responsive means.

8. An apparatus as claimed in claim 1, in which the valve seat clearing means includes:
(a) a riser means positioned upstream of the inlet valve and adapted to receive and to constrain the mixture to move initially upwardly prior to discharging through the inlet valve into the chamber,
(b) the riser means being shaped so as to cause solids that might otherwise tend to rest adjacent the inlet valve when the flow of the mixture therethrough ceases, to fall under gravity either forwardly through the inlet valve and into the chamber or backwardly through the inlet duct.

9. An apparatus as claimed in claim 2 in which:
(a) the outlet valve is responsive to a pressure difference between the outlet duct and the chamber so as to close upon lowering of pressure in the chamber by said pressure lowering means to hold the mixture in the chamber, and to open upon raising of pressure in the chamber by said pressure raising means, so as to discharge the mixture form the chamber,
and the apparatus further includes:
(b) an air relief means generally responsive to a minimum mixture level in the outlet duct, the air relief means having an intake communicating with the outlet duct, and an exhaust vented to atmosphere, and an air relief valve member controlling flow therebetween.

10. An apparatus as claimed in claim 9, in which the air relief means includes:
(a) a float communicating with flow in the outlet duct so as to float on the liquid when flow of mixture from the chamber is above a minimum level, and to move to a lower level when flow from the chamber is below the minimum level, the float cooperating with the air relief valve member.

11. An apparatus as claimed in claim 1, in which:
(a) the pressure lowering means includes a conduit having a conduit valve seat communicating with the chamber, the conduit being exposed to low pressure,
(b) the quantity sensing means includes a float adapted to float on a surface of the liquid in the chamber, the float being complementary to the valve seat to form a seal therewith, the float and valve seat establishing the predetermined intermediate quantity of mixture.

12. An apparatus as claimed in claim 11, in which the quantity sensing means includes:
(a) a float housing having upper and lower portions, the valve seat being located adjacent the upper portion, and the float housing having opening means communicating with the chamber to reflect level of mixture within the chamber, and also providing means to reduce chances of interference between the float and solids within the chamber,
(b) the float being constrained for movement relative to the valve seat between the upper and lower portions of the housing in response to changes in level of mixture within the chamber.

13. An apparatus as claimed in claim 1, in which:
(a) the quantity sensing means is also responsive to a predetermined lower quantity of mixture within the chamber, the lower quantity having a lower level in the chamber than the intermediate quantity, the quantity sensing means being adapted to select a subsequent mode of operation of the apparatus when the lower quantity of mixture is attained, in order to prepare the apparatus for a change in pressure in the chamber.

14. An apparatus as claimed in claim 13, in which:
(a) the quantity sensing means includes a float housing having upper and lower portions, the valve seat being located adjacent the upper portion, and the float housing communicating with the chamber to reflect level of mixture within the chamber,
(b) the float being mounted for movement between the upper and lower portions of the housing in response to changes in level of the mixture within the chamber, and the quantity sensing means further includes:
(c) a mode selecting means responsive to position of the float in the housing, the mode selecting means selectively controlling the pressure lowering means and the pressure raising means to control application of pressure to the chamber.

15. An apparatus as claimed in claim 1 in which the quantity sensing means comprises:
(a) mode selecting means for selecting mode of operation of the apparatus, the mode selecting means being responsive to quantity of mixture within the chamber and cooperating with the means for raising pressure and the means for lowering pressure.

16. An apparatus as claimed in claim 15, in which:
(a) the mode selecting means cooperates with the inlet flow sensor so as to expose the chamber to high pressure when flow in the inlet duct ceases, to initiate the discharge mode of the apparatus.

17. An apparatus as claimed in claim 15, further including:
(a) an outlet duct to receive flow from the outlet valve, and an outlet flow sensor means responsive to the outlet flow in the outlet duct,
and in which:
(b) the mode selecting means cooperates with the outlet flow sensor so as to expose the chamber to low pressure when the flow in the outlet duct ceases, to initiate an induction mode.

18. An apparatus as claimed in claim 15, in which:
(a) the quantity sensing means is responsive to a predetermined lower quantity of mixture in the chamber, which quantity has a corresponding level lower than level of the predetermined intermediate quantity of mixture,
(b) the mode selecting means includes an interchanging switch means which is actuated when the quantity of mixture within the chamber approaches the predetermined lower quantity.

19. An apparatus as claimed in claim 18, in which:
(a) the mode selecting means includes a float adapted to float on an upper surface of mixture in the chamber, the float being constrained to move between the two levels of liquid in the chamber as determined by the predetermined intermediate and predetermined lower quantities of mixture.

20. An apparatus as claimed in claim 19, in which:
(a) the pressure lowering means includes a conduit having a conduit valve seat communicating with the chamber, the conduit being exposed to low pressure,
(b) the float is complementary to the valve seat to form a seal therewith when the intermediate quantity of mixture is attained as the quantity of mixture within the chamber is rising,
(c) the interchanging switch means is responsive to the float when the quantity of mixture within the chamber is increasing and exceeds the lower level, and when the quantity of mixture within the chamber is decreasing and drops below the lower level.

21. A method of handling a solid/liquid mixture in which the mixture is temporarily stored within a receiving chamber, the method including the steps of:
(a) positioning an inlet valve adjacent an upper portion of the chamber above an uppermost level of mixture within the chamber,
(b) exposing the chamber to low pressure to generate a pressure difference across the inlet valve so as to open the inlet valve and draw the mixture into the chamber,
(c) sensing when the amount of mixture in the chamber attains a predetermined intermediate quantity and disconnecting the low pressure from the chamber,
(d) sensing when the flow of mixture in an inlet duct adjacent the inlet valve ceases, so as to permit the inlet valve to clear,
(e) increasing pressure in the chamber after the flow of mixture in the inlet duct ceases so as to close the inlet valve, and also to generate a pressure difference across an outlet valve of the chamber to open the outlet valve so as to discharge the mixture from the chamber.

22. A method as claimed in claim 21, further characterized by:
(a) after discharging the mixture through the outlet valve, sensing when flow of mixture therethrough ceases,
(b) subsequently exposing the chamber to low pressure to generate pressure differences across the valves, so as to close the outlet valve and to open the inlet valve to draw mixture into the chamber.

23. A method as claimed in claim 21, further characterized by:
(a) sensing flow of mixture within the inlet duct by mounting a rotatable paddle for rotation relative to the inlet duct, the paddle extending into the inlet duct,
(b) detecting rotation of the paddle from an undeflected position when there is essentially no flow in the duct, to a deflected position which is responsive to flow of mixture in the duct,
(c) actuating a switch means in response to movement of the paddle, the switch means controlling pressure raising means.

24. A method as claimed in claim 23, further characterized by:
(a) detecting movement of the paddle by a change in magnetic force associated with the paddle.

25. A method as claimed in claim 24, further characterized by:
(a) mounting adjacent the paddle a first magnetically responsive means for rotation with the paddle in response to movement of the paddle,
(b) mounting on the switch means a second magnetically responsive means, the second magnetically responsive means being positioned so as to be approached by the first magnetically responsive means as the paddle swings in response to flow in the duct, so as to actuate the switch means.

26. A method as claimed in claim 21, further characterized by:
   (a) after discharging the mixture through the outlet valve into an outlet duct, exhausting to atmosphere excess air carried in the mixture into the outlet duct.

27. A method as claimed in claim 21, further characterized by:
   (a) prior to the mixture entering the inlet valve, concurrently constraining the flow of mixture by a riser means which causes the mixture to move upwardly prior to entering the inlet valve and discharging into the chamber.

28. A method as claimed in claim 27, further characterized by:
   (a) permitting the inlet valve to clear by permitting any solids coming to rest adjacent the inlet valve, when the mixture flow therethrough ceases, to fall under gravity either forwardly through the inlet valve and into the chamber, or backwardly through the inlet duct.

29. A method as claimed in claim 21, further characterized by:
   (a) after constraining the mixture to move upwardly by the riser means, constraining the mixture to move downwardly prior to discharge through the inlet valve into the chamber.

30. A method as claimed in claim 22, further characterized by:
   (a) when the quantity of mixture in the chamber is increasing and approaches a predetermined lower quantity, interchanging a mode selecting means in preparation for applying high pressure to the chamber,
   (b) when flow through the inlet valve ceases, applying high pressure to the chamber.

31. A method as claimed in claim 22, further characterized by:
   (a) when the quantity of mixture in the chamber is decreasing and approaches a predetermined lower quantity, interchanging a mode selecting means in preparation for applying low pressure to the chamber,
   (b) when flow through the outlet valve ceases applying low pressure to the chamber.

32. An apparatus for handling a solid/liquid mixture, comprising:
   (a) a receiving chamber adapted to receive the mixture from an inlet duct in an induction mode and to hold the mixture temporarily prior to discharging the mixture in a discharge mode,
   (b) the chamber having inlet and outlet valves, the inlet valve communicating with the inlet duct to receive the mixture and being positioned adjacent an upper portion of the chamber above an uppermost level of the mixture within the chamber,
   (c) pressure lowering means for lowering pressure in the chamber to expose the inlet valve to a pressure difference so as to open the inlet valve and draw a mixture therethrough in the induction mode,
   (d) pressure raising means for raising pressure in the chamber in the discharge mode which tends to close the inlet valve,
   (e) quantity sensing means responsive to a predetermined intermediate quantity of mixture within the chamber to isolate the chamber from low pressure when said predetermined intermediate quantity is reached,
   (f) valve seat clearing means to clear the inlet valve of solids when flow therethrough ceases, and
   (g) an inlet flow sensor means responsive to inlet flow of mixture in said inlet duct to activate the pressure raising means when the said flow stops, so as to provide time for solids to clear the inlet valve before closure thereof; the flow sensor comprising rotatable paddle extending into the inlet duct and mounted for rotation between an undeflected position when there is essentially no flow in the duct, and a deflected position which is responsive to flow of mixture in the duct; the flow sensor further comprising a switch means cooperating with the pressure raising means to activate the pressure raising means when the paddle is in an undeflected position.

33. A method of handling a solid/liquid mixture in which the mixture is temporarily stored within a receiving chamber, the method including the steps of:
   (a) positioning an inlet valve adjacent an upper portion of the chamber above an uppermost level of mixture within the chamber,
   (b) exposing the chamber to low pressure to generate a pressure difference across the inlet valve so as to open the inlet valve and draw the mixture into the chamber,
   (c) sensing when the amount of mixture in the chamber attains a predetermined intermediate quantity and disconnecting the low pressure from the chamber,
   (d) sensing flow of mixture within the inlet duct by rotation of a paddle extending into the inlet duct, the paddle being held in a deflected position when there is flow in the duct, and rotating to an undeflected position when flow in the inlet duct ceases,
   (e) permitting the inlet valve to clear,
   (f) increasing the pressure in the chamber after the flow of mixture in the inlet duct ceases so as to close the inlet valve, and opening an outlet valve of the chamber to discharge the mixture from the chamber.

34. An apparatus as claimed in claim 3, further comprising:
   (a) a first magnetically responsive means associated with the paddle and being rotatable therewith, and the switch means includes a directional fluid valve apparatus having:
   (b) a valve body having an inlet port, an outlet port and a main bore, the ports communicating with the main bore,
   (c) a valve member mounted within the main bore for movement between first and second positions thereof, the valve member having a clearance means and a closure means to control flow between the ports,
   (d) a second magnetically responsive means cooperating with the valve member and being responsive to the first magnetically responsive means of the paddle, so that movement of the paddle actuates the valve member as required.

35. An apparatus as claimed in claim 34, in which:
   (a) the main bore has a main axis,
   (b) the valve member is a valve spool mounted for axial movement within the bore between the first and second positions thereof.

36. A valve apparatus as claimed in claim 34, in which:

(a) the inlet and outlet ports are spaced axially along the main bore by a port spacing, (b) the valve spool is generally cylindrical and has first and second end portions which are generally complementary to the main bore and serve as the closure means, and the clearance means has a diameter less than diameter of the end portions and a length which approximates to the port spacing to permit transfer of fluid between the ports when correctly positioned axially relative to the ports in the first position.

37. A valve apparatus as claimed in claim 34, further including:

(a) a biasing means urging the valve member to one of the two positions.

38. A valve apparatus as claimed in claim 36, further including:

a magnetically permeable protecting means positioned adjacent the first end of the spool to provide a cavity for the magnetically responsive means, the cavity having an axial length which is at least equal to movement of the spool between the first and second positions thereof.

* * * * *